United States Patent [19]

Reynard

[11] 4,268,142
[45] May 19, 1981

[54] CAMERA EMPLOYING WEB FOR FILM EJECTION AND PROCESSING

[75] Inventor: John M. Reynard, Framingham, Mass.

[73] Assignee: Polaroid Corporation, Cambridge, Mass.

[21] Appl. No.: 109,124

[22] Filed: Dec. 31, 1979

[51] Int. Cl.³ ............................................. G03B 17/50
[52] U.S. Cl. ..................................................... 354/86
[58] Field of Search ............... 354/275, 174, 276, 186, 354/277, 304, 173, 187, 83, 86, 178–182

[56] References Cited

U.S. PATENT DOCUMENTS

| | | | |
|---|---|---|---|
| 2,435,717 | 2/1948 | Land | 354/86 |
| 2,443,154 | 6/1948 | Wolff | 354/86 |
| 2,458,186 | 1/1949 | Messina et al. | 354/86 |
| 2,708,864 | 5/1955 | Land | 354/304 X |
| 2,873,658 | 2/1959 | Land | 354/86 |
| 3,364,834 | 1/1968 | Erikson | 354/304 |
| 3,369,469 | 2/1968 | Downey | 354/86 |
| 3,653,308 | 4/1972 | Erlichman | 354/86 |
| 3,702,580 | 11/1972 | Erlichman | 354/86 X |
| 3,744,386 | 7/1973 | Douglas | 354/187 |
| 3,938,167 | 2/1976 | Amey et al. | 354/86 |
| 3,940,774 | 2/1976 | Ivester | 354/83 |
| 3,965,480 | 6/1976 | Eloranta | 354/83 |
| 4,100,559 | 7/1978 | Wareham et al. | 354/277 |
| 4,132,471 | 1/1979 | Svatek et al. | 354/86 |
| 4,147,425 | 4/1979 | Friedman et al. | 354/304 |
| 4,152,063 | 5/1979 | Hennig | 354/86 X |
| 4,171,886 | 10/1979 | Stemme et al. | 354/86 |
| 4,172,647 | 10/1979 | Gold | 354/86 |

Primary Examiner—Donald A. Griffin
Attorney, Agent, or Firm—David R. Thornton

[57] ABSTRACT

A film unit ejection and processing system for instant cameras having a spread roller pressure nip through which an exposed film unit is passed from the camera interior for processing and discharge to the camera exterior. The system includes an opaque feed web to frictionally engage each film unit and having a flight portion extending through the pressure nip to an end secured to a tray supported for reciprocation on the camera exterior. The tray carries guide rollers to support the feed web in a loop configuration so that the end of the web opposite from the tray connected end may be secured to the camera body without interference with film unit feeding by frictional engagement with the web flight portion extending from the pressure nip. The tray further operates a spring biased pick arrangement by which each film unit is advanced to present its leading edge at the pressure nip. Also, the web may be provided with frictional engagement augmenting means such as a roughened traction surface, a spread roller separating formation positioned to immediately precede the leading edge of a film unit into the pressure nip or traction nubs located to push the rear edge of the film unit through the pressure nip.

15 Claims, 14 Drawing Figures

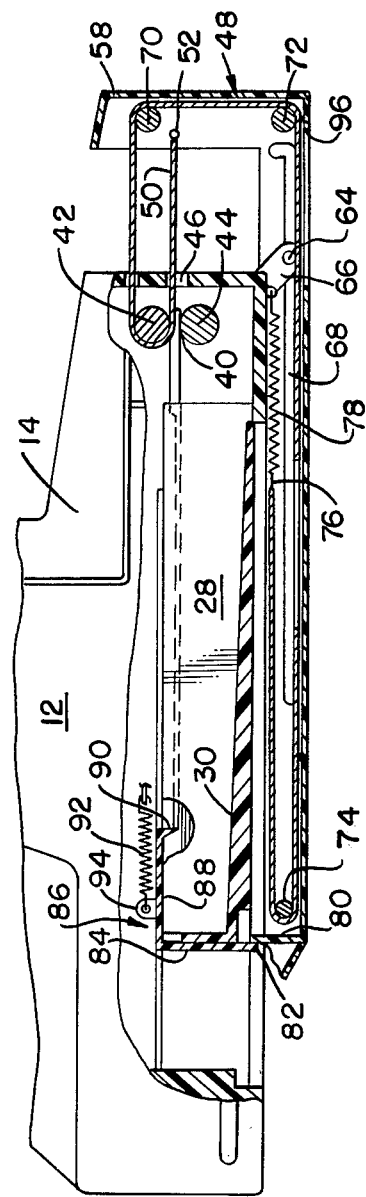
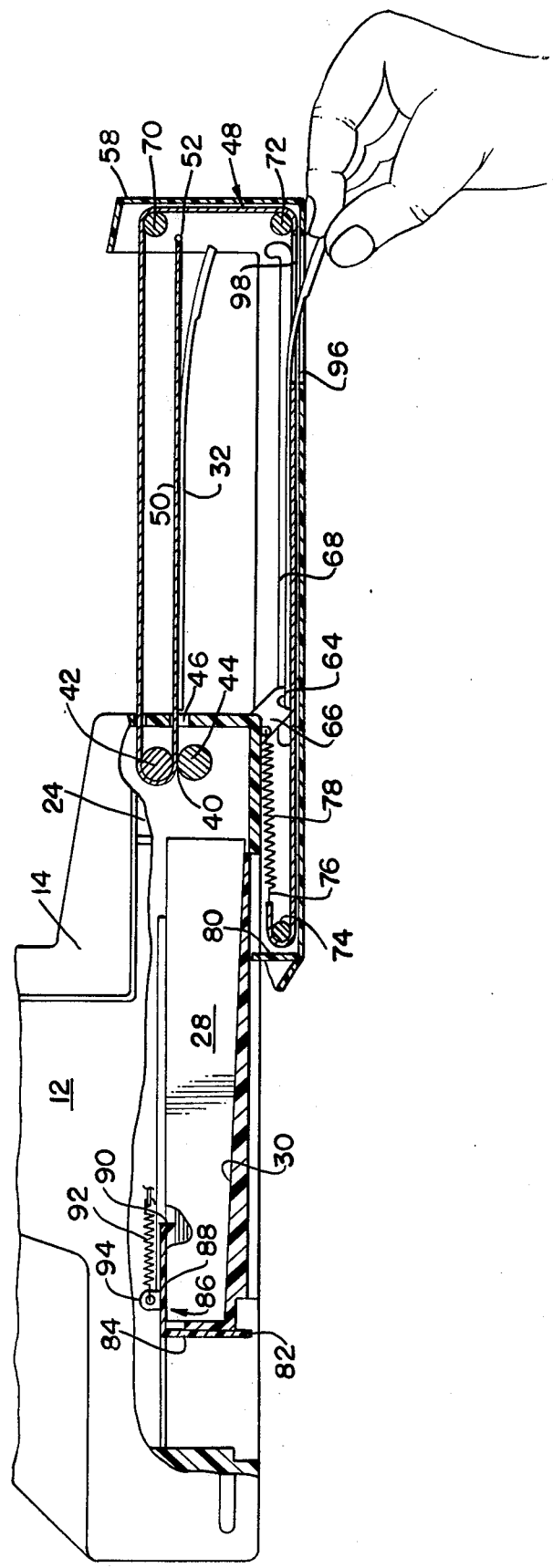

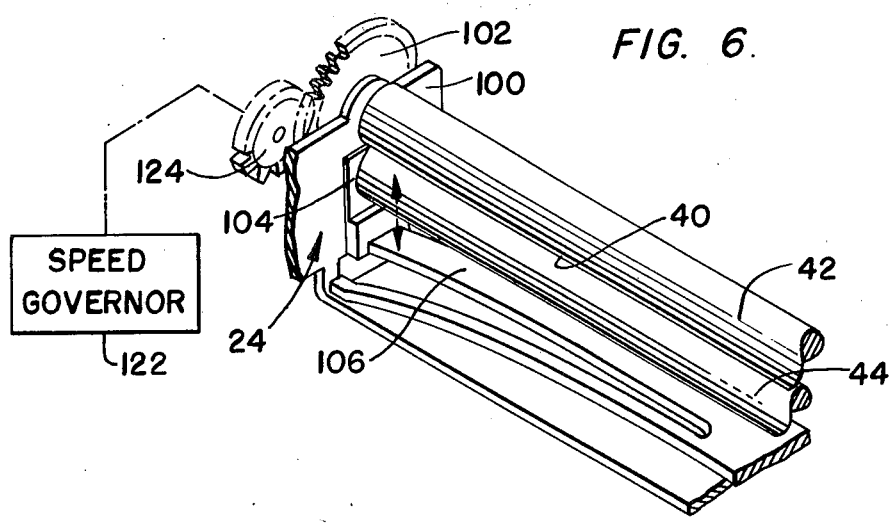
FIG. 6.
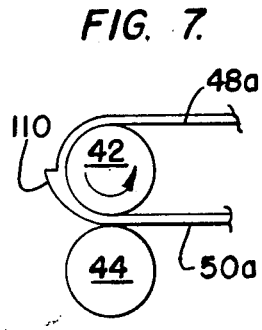
FIG. 7.
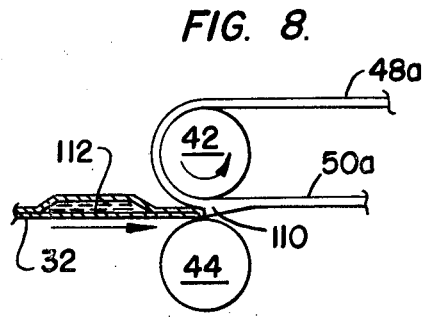
FIG. 8.
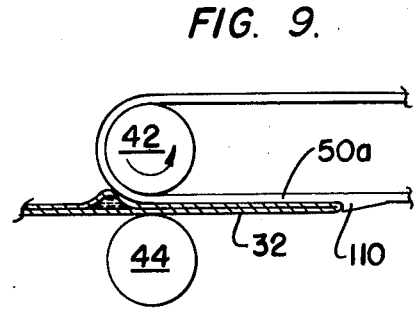
FIG. 9.
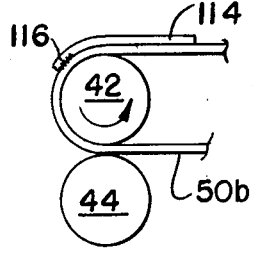
FIG. 10.
FIG. 11.
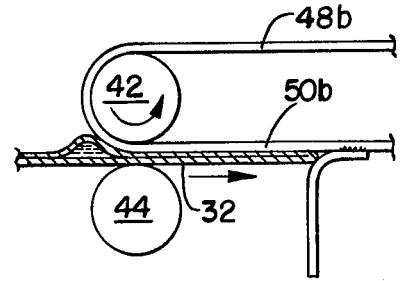
FIG. 12.
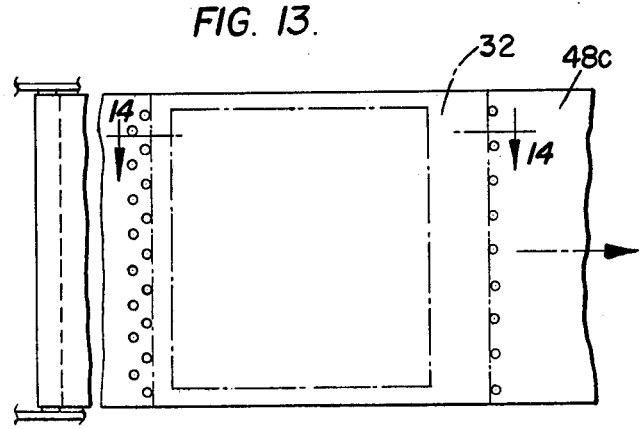
FIG. 13.
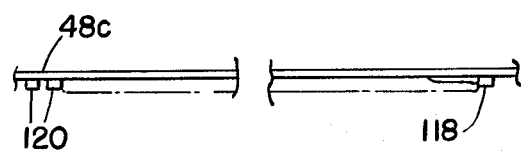
FIG. 14.

CAMERA EMPLOYING WEB FOR FILM EJECTION AND PROCESSING

BACKGROUND OF THE INVENTION

This invention relates to photographic equipment and more particularly, it concerns an improved system for processing and ejecting photographic film units of a type in which a film unit carried supply of processing fluid is spread over an area of exposed photosensitive materials as the unit is passed from the interior of a camera designed to handle such units.

Camera systems in which film units may be exposed and processed instantly on withdrawal or ejection of the exposed unit from a camera are now well known in the art. In general, such systems include a pair of spread rollers or equivalent means to establish a pressure nip through which each film unit is passed after exposure in order to rupture a unit carried pod of processing fluid and spread the fluid uniformly over the exposed photographic materials, usually lying at the interface of a pair of sheets in the unit, so that the latent image formed by exposure of such materials will be developed into a real or visual photographic image. In early systems, each film unit was provided or associated with some form of pull tab accessible at the camera exterior and which, when pulled manually, effected a withdrawal of the associated film unit through the aforementioned pressure nip. More recently, instant camera systems have become available in which improved film units are ejected from the camera, again through a processing fluid spreading pressure nip, by a motor-driven system. A principal advantage of the more recent of these systems is that they are "trash free"; that is, only the film unit is discharged from the camera with no pull tab or other discardable material accompanying the unit structure providing the final photograph.

Motor-driven processing fluid spreader systems for instant cameras possess several additional advantages which are important to film unit processing. For example, the speed at which the film unit is passed through the pressure nip can be controlled very accurately. This is important not only from the standpoint of assuring the uniform spread of processing fluid over the area of the exposed photographic materials contained in the unit, but also from the standpoint of controlling the length of time that infinitely successive increments of the film unit remain protected from light within the camera structure after processing fluid has been spread over such increments. In other words, the short duration of time between contact by the processing fluid and exit from the camera into ambient light permits the film to become insensitive to light before exiting from the camera. Equally as important as control over the rate of film unit feed through the pressure nip is that the driving force for feeding the unit is applied directly at the pressure nip by the rotatably driven rollers in a manner to avoid any film unit stresses which would interfere with uniform spreading of the processing fluid.

On the other hand, motor-driven processing fluid spreading systems for instant cameras suffer from such disadvantages as manufacturing costs, complexity of component packaging within the camera and need for a source of electrical energy of sufficient capacity to meet the power requirements of the motor drive. Additionally, it is necessary for at least one of the pressure nip defining rollers to be finished with a traction or friction surface so that rotation of the roller will be translated into linear movement of the film unit. Although all of these disadvantages have been overcome as is evidenced by instant camera systems available commercially at the present time, the success of the presently available systems has involved a measure of compromise in system costs. There is a need, therefore, for a manually actuated processing fluid spreader system for instant cameras by which costs incident to electric motor drives can be avoided but without compromise in the overall effectiveness of system operation.

SUMMARY OF THE PRESENT INVENTION

In accordance with the present invention, a feed web is employed to essentially pull a photographic film unit through a spread roller gap and from the camera in which it is exposed while simultaneously processing the film unit by a spread of unit-carried processing fluid uniformly over the area of exposed photosensitive materials in the unit. The system features a feed web having a flight portion extending through the pressure nip of a pair of spread rollers to an end capable of being pulled from the camera exterior. The feed web is arranged so that a film unit presented at the nip of the rollers with the feed web will be drawn through the nip under the feed web and in the direction of feed web movement to the camera exterior. The pulled end of the feed web is preferably connected to a reciprocal tray unit movable along the bottom of the camera body and having guide rollers to support the web in flight portions defining a take up loop to accommodate movement of the pulled end and the tray through a distance at least as great as the length of each film unit. The tray additionally functions to retract a forwardly biased pick unit by which each film unit is advanced from a position for exposure in the camera, forwardly until the leading edge of the unit is located at the nip of the spread rollers. The rate of speed at which the tray may be moved and thus the film unit drawn through the nip of the spread rollers is governed by suitable means such as the centrifugal brake governor or the like.

The feed web is formed of a thin polyester film such as Mylar and is opaque so as to prevent ambient light from striking the film unit immediately as it is drawn from the camera interior. The face of the web which overlies the film unit is provided with a traction surface to minimize slippage between the web and the film unit. Additionally, roller spreading formations may be provided on the web and located to precede at least the leading edge of the film unit through the pressure nip. Also, the web may be provided with nub-like formations located to follow the trailing edge of the film unit in a manner to assure direct movement of the film unit with the web.

Among the objects of the present invention are, therefore: the provision of an improved film unit ejection and processing system for instant cameras which may be manually operated; provision of such a system which is adaptable to existing camera constructions with minimal modifications; the provision of such a system which effects a temporary light shield for the film unit as it is processed during the ejection from the camera; the provision of such a system which, though manually actuated, may be governed to assure uniform speed of film unit movement during processing by passage through the nip of a spread roller pair; and the provision of such a system which is capable of low cost manufacture and assembly while at the same time being highly effective in operation.

Other objects and further scope of applicability of the present invention will become apparent from the detailed description to follow taken in conjunction with the accompanying drawings in which like parts are designated by like reference numerals.

BRIEF DESCRIPTION OF THE DRAWINGS

FIGS. 4 and 5 are fragmentary cross-sections similar to FIG. 3 but showing components in different relative positions;

FIG. 6 is a fragmentary perspective view illustrating a conventional spread roller organization with which the present invention is used;

FIGS. 7-9 are fragmentary sectional views depicting a feed web modification and successive positions of operation;

FIGS. 10-12 are similar to FIGS. 7-9 but showing an alternative embodiment;

FIG. 13 is a bottom plan view of a further modified feed web in accordance with the present invention; and FIG. 14 is a fragmentary cross-section on line of FIG. 13.

DETAILED DESCRIPTION OF THE PREFERRED EMBODIMENTS

Figure 1:
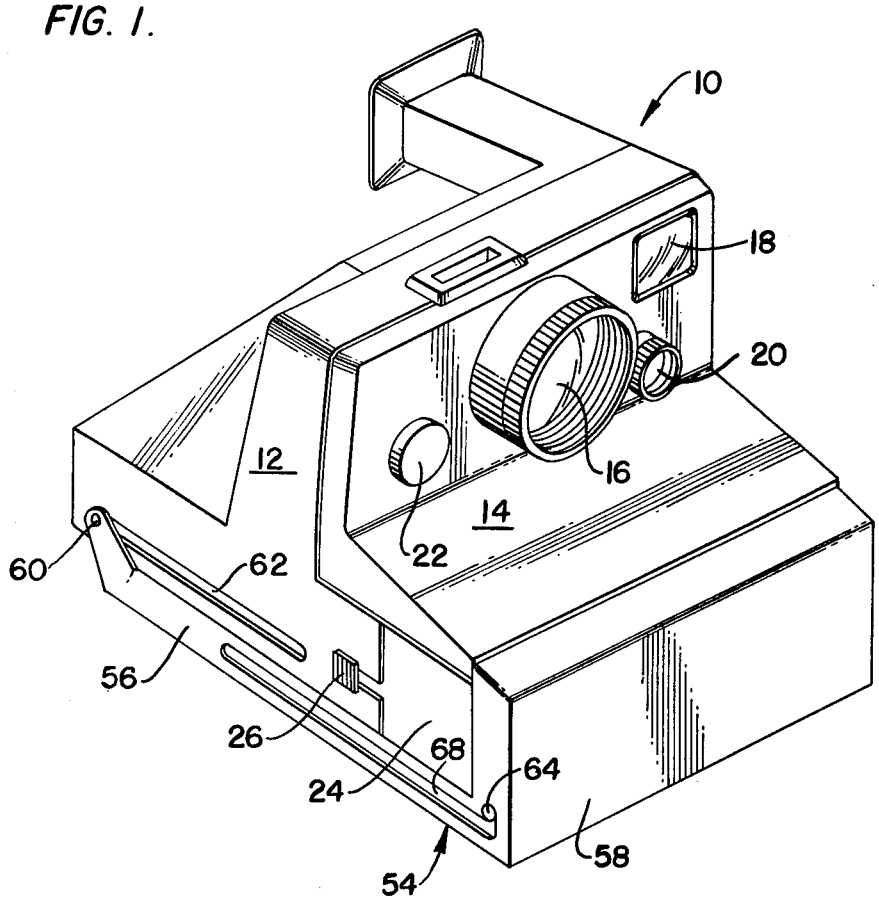
FIG. 1 is a perspective view of a camera incorporating the system of the present invention.
Figure 3:
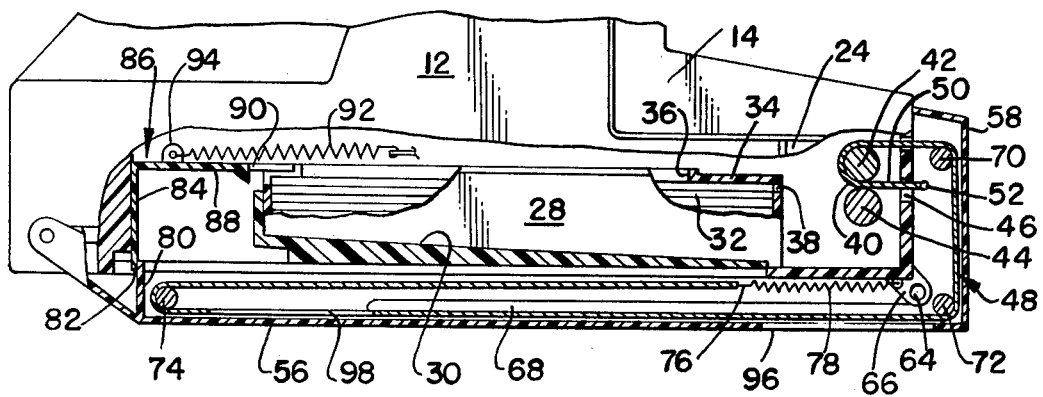
FIG. 3 is a fragmentary longitudinal cross-section of the assembly illustrated in FIG. 1.
Figure 2:
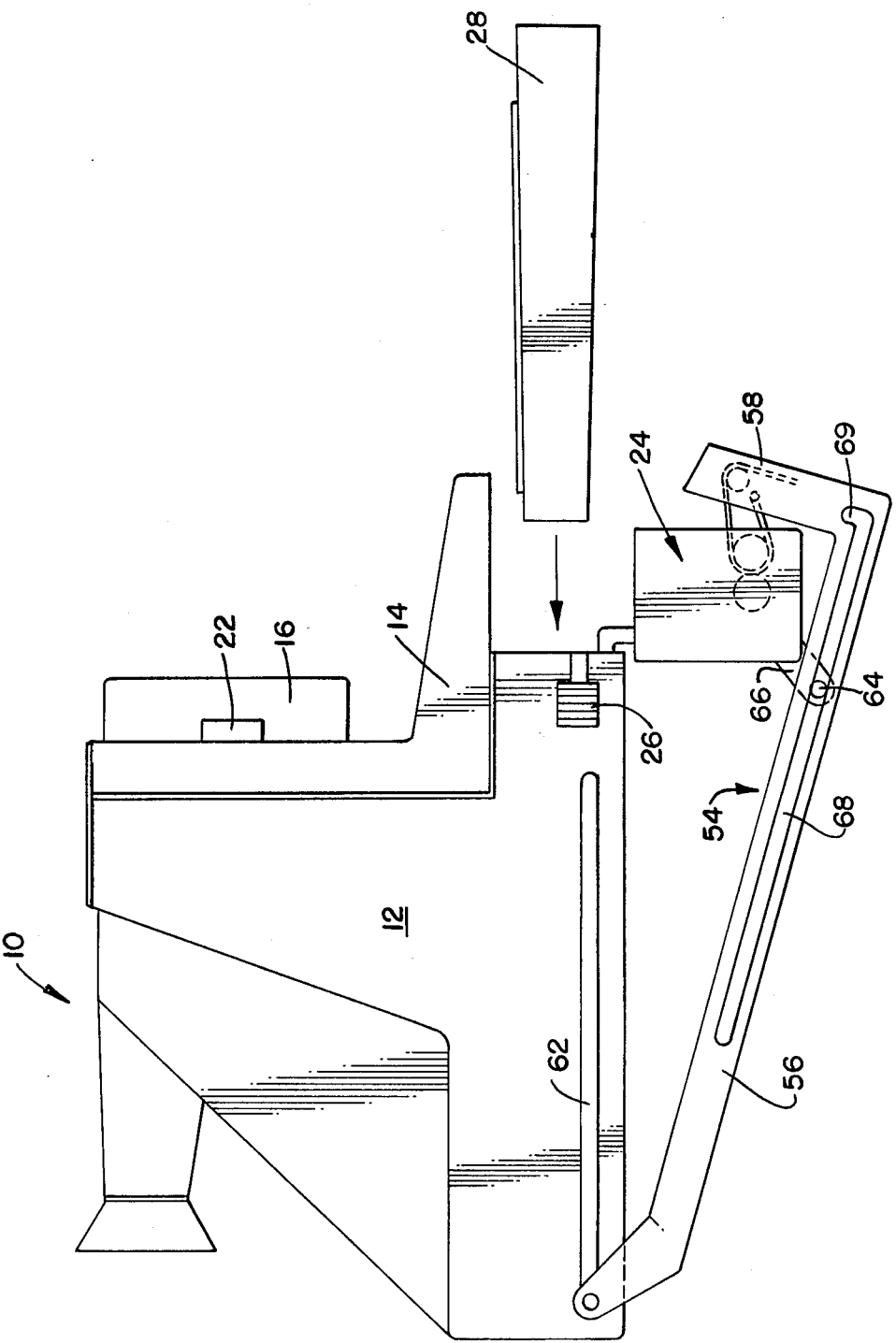
FIG. 2 is a side elevation of the camera assembly shown in FIG. 1 and depicting the loading of a multi-unit film pack.

In FIGS. 1-3 of the drawings, an embodiment of the film unit ejection and processing system of the invention is shown to be incorporated in a camera 10. Though modified slightly in a manner to be described in more detail below, the camera 10 represents one of several well-known instant cameras and as such includes a body 12 with a front cover 14 mounting such components as an objective lens 16, a view finder lens 18, a photocell window 20 and an actuating button 22. A door housing 24 is hinged at the lower front of the body 12 for movement between an open position, as shown in FIG. 2, and a closed position shown in FIG. 1 and in which it is releasably retained by a latch 26.

When this door housing is released to its open position as shown in FIG. 2, the camera 10 may be loaded with a film pack 28 by insertion of the latter rearwardly into a film pack chamber 30 provided in the base of the camera body 12. The film pack 28 is preferably of a type available commercially under the tradename "POLAROID SX-70 LAND FILM". As such, the pack 28 carries a plurality of superimposed film units 32 (FIG. 3) biased upwardly by a spring follower (not shown) so that the uppermost of the units 32 is biased against a top wall 34 of the film pack container to be presented in a window 36 for exposure in the camera. The film pack container is further provided with a slot 38 in its forward wall so that after exposure of each unit, it may be passed through the slot 38 for ultimate removal from the camera. Further, it will be noted that the slot 38, when the film pack 28 is fully loaded in the camera, is aligned with the pressure nip 40 of a pair of spread rollers 42 and 44 rotatably supported in the door housing 24. The door housing is further provided with a film unit ejection opening or slot 46 also aligned with the pressure nip 40 and the slot 38.

As mentioned above, the camera 10 is representative of several commercially available models in which each film unit 32, after exposure, is passed from the film pack 28 through the nip 40 of the rollers 42 and 44 which are driven, usually by an electric motor, to eject the film unit from the camera. In accordance with the film unit ejection and processing system of the present invention, operation of the rollers 42 and 44 is effected manually by a thin feed web 48 of such polyester materials as "Mylar" arranged with a flight portion 50 extending about the roller 42 and through the pressure nip 40 to a pull bar 52 to which one end of the feed web is secured. Thus movement of the bar 52 and flight portion 50 outwardly of the cover housing 24 will bring about movement of each film unit through the pressure nip 40 in a manner to be described.

In the disclosed embodiment, the feed web 48 is supported by a generally L-shaped tray 54 having a bottom portion 56 underlying and generally coextensive with the bottom of the camera body 12. The bottom portion 56 joins with an upstanding front portion 58 which, as shown in FIGS. 1 and 3, for example, generally overlies the front of the closed cover housing 24. The tray 54 is secured for relative rectilinear motion with respect to the camera body 12 by suitable means such as inwardly directed pintles 60 on opposite sides at the rear end of the tray base portion 56 engaging in slots 62 on opposite sides of the camera body 12. Similar pintles 64 are supported on tabs 66 extending downwardly and forwardly from the door housing 24 to engage in slots 68 in opposite sides of the bottom portion 56 of the tray 54. The slots 68 may be formed with an upwardly directed notch or J-slot configuration 69 (FIG. 2) in order to latch the tray 54 in its rearwardmost or retracted position.

The tray 54 supports three transversely extending and rotatable guide rollers 70, 72 and 74. As will be noted in FIG. 3, the rollers 70 and 72 are positioned in the upstanding front portion 58 of the tray 54 whereas the roller 74 is located near the rear of the bottom portion of the tray. The pull bar 52, to which the aforementioned one end of the feed web 48 is secured, is fixed in the front portion 58 of the tray 54 and thus will follow rectilinear movement of the tray. The opposite end 76 of the feed web 48 is secured to the bottom of the door housing 24 preferably by a tension spring 78 so that the feed web will be held under tension but in a yieldable manner.

As shown in FIG. 3, the feed web initially extends from its wrap about the roller 42, about the tray-carried guide rollers 70 and 72 and through what may be termed a take-up loop in flight portions passing from the guide roller 72 about the roller 74 to the camera-attached end 76. Thus, any movement of the flight portion 50 with the pull bar 52 and the tray 54 will be accompanied by a fore-shortening of the take-up loop defined by flight portions extending from the end 76 about the guide roller 74 to the guide roller 72 as a result of the guide roller 74 moving with the pull bar 52.

The structure of the tray 54 further includes an upstanding tab or wall-like portion 80 near the rear end of the bottom tray portion 56 as may be seen in FIG. 3, for example. As shown, the tab 80 extends above the lower end 82 of one leg 84 of an L-shaped pick member 86. Another leg 88 of the pick member 86 terminates at its forward end in a pick 90. The pick member is slidably mounted for horizontal reciprocal movement in the body 12 between a retracted position shown in FIG. 3 and an extended forward position (FIG. 4) in a horizontal reference plane related to the loaded film pack 28 so that the pick 90 will engage the uppermost film unit 32 or its equivalent during forward travel. The pick member is, moreover, biased toward its extended forward position by a tension spring 92 extending from the body 12 to a tab 94 on the leg 88.

On the basis of the structural relationships thus far described, manipulation of the tray 54 and related components of the camera 10 to load the film pack 28 and discharge each of the film units 32 from the loaded pack may now be understood by reference to FIGS. 2–5 of the drawings. As is well known in the art, the film pack 28 is initially supplied with a dark slide (not shown) which, in a fresh film pack, overlies the uppermost of the film units 32 in the pack to prevent light from entering the opening 36 in the film pack container. The dark slide must, of course, be ejected from the loaded film pack before any of the units 32 may be exposed in the camera. Thus, with the door housing 24 in its open position as shown in FIG. 2, the film pack 28 is loaded rearwardly into the film pack chamber 38 as above mentioned. Because the tray 54 is in a lowered position to allow such loading of the pack 28, the upstanding tab 80 will allow the pick member 86 to be held by the spring 92 in its extended forward position. Thus as the film pack 28 is pushed rearwardly into the chamber 30, the pick 90 will engage the dark slide and displace it forwardly through the slot 38. When the door housing 24 is closed and the tray 54 swung upwardly to its operative position shown, for example, in FIGS. 1 and 3, the tab 80 will engage the leg 84 on the pick member 86 to retract it rearwardly against the bias of the spring 92. Subsequent forward movement of the tray 54 will cause the pick 90 to again engage the dark slide and advance its leading edge to the nip 40 of the pressure roller pair, whereupon continued movement of forward movement of the tray and the flight portion 50 of the feed web 48 will cause the dark slide to be ejected from the camera. The tray will then be returned to the position shown in FIG. 3 and latched by the pintles 64 in the J-slot portions 69.

The uppermost of the film units 32 in the film pack is now ready for exposure in the camera and when so exposed, is ejected from the camera and processed as a result of the sequences illustrated in FIGS. 4 and 5 of the drawings. As shown in FIG. 4, the tray 54 has been advanced forwardly by an amount sufficient to allow the pick 90 to advance the uppermost film unit 32 so that its leading edge is positioned in the nip 40 between the spread rollers 42 and 44. Continued forward movement of the tray 54 to the ultimate position shown in FIG. 5 will cause the film unit 32 to be advanced through the rollers 42 and 44 in contact with and underlying the flight portion 50 of the feed web 48 until the unit drops into the bottom portion 56 of the tray. It will be noted from FIG. 5 that the floor of the bottom portion of the tray 56 is provided with an opening 96 with which an opening 98 in the feed web 48 registers when the tray 54 is moved to its forwardmost position. The exposed and processed film unit 32 may now be removed through the openings 96 and 98 in the manner shown in FIG. 5. When the tray is returned to its retracted position, the tab 80 will again engage the leg 84 of the pick member 86 and move it to its retracted position. The latching facility provided by the J-slot portion 69 in cooperation with the pins 64 will operate to retain the tray and the pick member 86 in this position or in the position shown in FIG. 3 of the drawings.

A more complete understanding of co-action between the feed web 48, the spread rollers 42 and 44, and the film units 32 may be gained by reference to FIGS. 6–14 of the drawings. In FIG. 6, the mounting of the spread roller pair in the door housing 24 of a conventional camera is shown. Specifically, the upper roller 42 is journalled on a fixed transverse axis from opposite ends by brackets 100 which, for purposes of the present invention, may be treated as a part of the door housing 24. A gear 102 is keyed or otherwise coupled for rotation directly with the roller 42. The lower roller 44 is journalled at opposite ends in bearing units 104 slidable vertically in a plane containing the axis of both rollers 42 and 44. Pressure at the nip 40 between the two rollers 42 and 44 is maintained by a leaf spring 106 acting on the bearing units 104. It is to be understood therefore, that the existing basic structural organization of the spread rollers 42 and 44 is maintained in the system of the present invention.

In order to assure that the leading edge of each film unit is gripped in an adequately positive manner so that it will be fed through the pressure nip 40 in a manner causing the lower roller 44 to be moved against the spring 106 and at the same time prevent slippage of the feed web 48 relative to the film unit, the surface of the feed web 48 is preferably provided with a traction surface or equivalent means by which the feed web and film unit will travel without slippage into and through the pressure nip 40. Such a traction surface may be provided by a frosted, etched or otherwise roughened surface on that face of the feed web which contacts the film unit. In addition, the web may be provided with means to assure particularly that the leading edge of each film unit is introduced into the pressure nip 40 between the spread rollers. Thus, in FIGS. 7–9, the feed web 48a is provided with a wedge formation 108 positioned along the length of the web so as to immediately precede entry of the leading edge of each film unit into the nip between the rollers 42 and 44. The wedge portion 110 will affect a separation of the lower roller 44 from the roller 42 sufficiently so that the leading edge of the film unit will be drawn into the pressure nip without interfering with the co-action of the rollers to rupture and spread a film unit carried supply of processing fluid 112 over the image format area of the film unit. The wedge is also preferably cam shaped so as to tailor the force profiles as the film enters the roller gap. Additionally, by extending the wedge outboard of the film and providing an appropriate rearwardly directed cam face (not shown) the rollers may also be slowly and gently lowered to the film unit once it has fully entered the roller gap.

As an alternate to the wedge portion 110, and as shown in FIGS. 10–12 of the drawings, the feed web 48b may be provided with a flap 114 of the same material as that from which the feed web 48 is formed and secured only at its leading edge 116 to the feed web 48b. As may be seen by a comparison of FIGS. 10 and 11, as the leading edge of the flap 114 enters the pressure nip between the rollers 42 and 55, the flap will fall to the position shown in FIG. 11 in a manner such that a crease is formed for gripping the leading edge of the film unit 32.

In FIGS. 13 and 14, a further modification of the feed web is shown and designated by the reference numeral 48c. Specifically, in the embodiment of FIGS. 13 and 14, the feed web 48c is provided with projecting bumps or solid nubs 118 and 120. The nubs 118 are located in a line at a position along the length of the feed web 48c to precede the leading edge of the film unit 32. These nubs, therefore, will function to separate temporarily the rollers 42 and 44 in a manner similar to that described above with respect to the wedge portion 110. The nubs 120 are arranged in one or more transverse rows faced from the nubs 118 by a distance approximating the length of the film unit 32. The nubs 120 will, therefore, engage the following edge of each film unit to push the unit without slippage between the web 48c and the film unit. By providing two or more rows of the nubs 120 at the trailing edge of the film unit, any slippage which might occur will be limited by engagement of the trailing edge of the film unit with successive rows of the nubs 120.

It is important to proper processing of each film unit that the speed at which it passes between the spread rollers 42 and 44 be uniform throughout travel of the film unit between the rollers. While a uniform speed of film unit travel through the spread rollers 42 and 44 may be accomplished by an appropriate measure of care on the part of the camera operator, it is preferred that some speed regulating means be associated with the movement of the tray 54 and, particularly, of the web 48. As shown schematically in FIG. 6, a speed governor 122 is mechanically coupled through a gear 124 with the gear 102 on the roller 42. The speed governor may be any of several well-known devices such as a centrifugal brake governor, a fan governor or the like. Although the governor 122 is shown associated with the gear 102 and thus with the roller 42, it is also contemplated that the governor may be mechanically connected directly to the tray 54 such as by providing a rack portion on the tray 54 engaged by a pinion (not shown) associated with the governor 122.

While manual actuation is illustrated, it should be noted that the web or rack may be motor driven to pull the film through the spreader system by means of the web.

Thus it will be seen that as a result of the present invention, a manually actuated system is provided by which film units exposed in conventional instant cameras may be processed and ejected from the camera in a highly effective manner. It will be equally appreciated that changes and/or modifications may be made in the embodiments disclosed herein without departure from the inventive concepts manifested by the disclosed embodiments. It is expressly intended therefore that the foregoing description is illustrative of preferred embodiments only, not limiting, and that the true spirit and scope of the present invention be determined by reference to the appended claims.

What is claimed is:

1. A photographic film unit processing and ejection system for instant cameras having means defining a pressure nip through which an exposed film unit is passed from the camera interior for processing and discharge to the camera exterior, said system comprising:
   a feed web having a flight portion extending through the pressure nip in the direction of film unit travel from the camera interior;
   means located in the camera for advancing at least the leading edge of an exposed film unit into pressure contact with a portion of said feed web in the pressure nip; and
   means for pulling said feed web flight portion to draw the exposed film unit through the pressure nip due to engagement thereof by said feed web, said feed web pulling means comprising a manually movable tray supported for reciprocal movement relative to the camera and the pressure nip, and means connecting an end of said feed web flight portion directly to said tray.

2. The apparatus recited in claim 1 wherein said feed web is opaque and arranged to overlie the side of the film unit presented for exposure within the camera, thereby to shield the unit from ambient light as it passes to the camera exterior.

3. The apparatus recited in claim 1 wherein said film unit advancing means comprises a forwardly biased pick member, said tray means including means to retract said pick member against the forward bias thereof.

4. An instant camera comprising:
   a first housing member;
   means for defining a pressure nip adapted to effect the spreading of a processing fluid across a film unit as the film unit is advanced therethrough;
   a manually accessible second housing member mounted for reciprocal movement relative to said first housing member between a normal first unextended position and a second position wherein it extends away from said first housing; and
   an elongated web extending through said pressure nip and connected to said second housing member so that an intermediate section of said web moves through said pressure nip as said second housing member is displaced from its said unextended position to its said extended position, and said intermediate section of said web returns through said pressure nip as said second housing is subsequently returned to its said unextended position, said intermediate section of said elongated web serving to advance a film unit through said pressure nip once a leading edge of the film unit has been positioned into said pressure nip in engagement with said elongated web and said second housing member is subsequently displaced from its said unextended position into its said extended position.

5. The camera of claim 4 additionally comprising means responsive to the initial displacement of said second housing member away from its said unextended position for advancing the leading edge of a film unit into said pressure nip in engagement with said elongated web, further displacement of said second housing member into its said extended position serving to advance the film unit entirely through said pressure nip.

6. The invention of claim 5 wherein a plurality of the film units are housed within a pack adapted to be positioned within said first housing member for film unit exposure operations and said means for advancing the leading edge of a film unit into said pressure nip comprises a film unit pick member disposed on the opposite side of the film pack from said pressure nip, a spring urging said pick member towards a film unit within the film pack and towards said pressure nip, said pick member having a portion thereof engaging said second housing member under the influence of said spring when said second housing member is in its said unextended position, said pick member being arranged such that further movement thereof under the influence of said spring is precluded once said second housing member has been displaced away from its said unextended position a sufficient distance such that said pick member has advanced the leading edge of a film unit into said pressure nip.

7. The camera of claim 4 wherein at least said intermediate section of said elongated web is formed of an opaque material of sufficient width to light shield one side of the film unit as it advances from said pressure nip.

8. The camera of claim 4 wherein one end of said elongated web is connected to said second housing member and additionally including a resiliently biasing member connected between the other end of said elongated web and said first housing member.

9. The camera of claim 4 additionally including means carried by said elongated web for temporarily enlarging the size of said pressure nip to facilitate the introduction of the leading edge of a film unit thereinto.

10. A photographic film unit processing and ejection system for instant cameras having means defining a pressure nip through which an exposed fiom unit is passed from the camera interior for processing and discharge to the camera exterior, said system comprising:
- a feed web having a flight portion extending through the pressure nip in the direction of film unit travel from the camera interior;
- means located in the camera for advancing at least the leading edge of an exposed film unit into pressure contact with a portion of said feed web in the pressure nip;
- means on the exterior of said camera for pulling said feed web flight portion to draw the exposed film unit through the pressure nip due to engagement thereof by said feed web; and
- means carried on said feed web for augmenting frictional engagement of said feed web and a film unit, said frictional engagement augmenting means comprising means carried by said feed web to temporarily enlarge the size of the pressure nip to the approximate thickness of at least the leading edge of the film unit.

11. The apparatus recited in claim 10, wherein said feed web carried means comprises a wedge formation located on said feed web to precede movement of the leading edge of the film unit into the pressure nip.

12. The apparatus recited in claim 10, wherein said feed web carried means comprises a row of solid nubs projecting from said web in the direction of the film unit and located on said feed web to precede movement of the leading edge of the film unit into the pressure nip.

13. The apparatus recited in claim 10, wherein said feed web carried means comprises a flap of flexible material having a leading edge fixed to said feed web and a free trailing edge, thereby to provide between said flap and said feed web, a crease into which the leading edge of a film unit is advanced preceding passage thereof through the pressure nip.

14. The apparatus recited in claim 10 wherein said feed web carried means comprises a plurality of solid nubs projecting from said web in the direction of the film unit and located on said feed web to engage and push the trailing edge of a film unit in the direction of feed web travel.

15. The apparatus recited in claim 14 including at least two rows of said nubs, said rows being spaced in the direction of feed web travel.

* * * * *